(12) United States Patent
Kempf et al.

(10) Patent No.: US 8,715,128 B2
(45) Date of Patent: May 6, 2014

(54) MULTI-SPEED TRANSMISSION

(75) Inventors: Gregory W. Kempf, Avon, IN (US); Douglas Scott Burchett, Indianapolis, IN (US)

(73) Assignee: GM Global Technology Operations, Detroit, MI (US)

( * ) Notice: Subject to any disclaimer, the term of this patent is extended or adjusted under 35 U.S.C. 154(b) by 69 days.

(21) Appl. No.: 13/309,441

(22) Filed: Dec. 1, 2011

(65) Prior Publication Data
US 2013/0143709 A1 Jun. 6, 2013

(51) Int. Cl.
*F16H 3/62* (2006.01)
*F16H 3/44* (2006.01)
*F16H 37/06* (2006.01)

(52) U.S. Cl.
USPC ........... 475/275; 475/276; 475/279; 475/280; 475/282; 475/384; 475/286; 475/290; 475/330

(58) Field of Classification Search
USPC .................................. 475/275–293, 303, 330
See application file for complete search history.

(56) References Cited

U.S. PATENT DOCUMENTS

| | | | | |
|---|---|---|---|---|
| 4,088,043 A | * | 5/1978 | Johnson et al. | 475/280 |
| 4,346,623 A | * | 8/1982 | Tatsuo | 475/286 |
| 6,176,803 B1 | | 1/2001 | Meyer et al. | |
| 6,558,287 B2 | | 5/2003 | Hayabuchi et al. | |
| 6,716,132 B1 | * | 4/2004 | Usoro et al. | 475/303 |
| 6,743,139 B1 | * | 6/2004 | Usoro et al. | 475/275 |
| 6,984,187 B2 | | 1/2006 | Biermann | |
| 6,991,578 B2 | | 1/2006 | Ziemer | |
| 7,011,597 B2 | | 3/2006 | Haka | |
| 7,018,319 B2 | | 3/2006 | Ziemer | |
| 7,101,305 B2 | | 9/2006 | Tabata et al. | |
| 7,163,484 B2 | | 1/2007 | Klemen | |
| 7,608,008 B2 | * | 10/2009 | Seo | 475/276 |
| 7,614,975 B2 | * | 11/2009 | Seo | 475/278 |
| 2005/0090362 A1 | | 4/2005 | Abe et al. | |
| 2006/0270513 A1 | | 11/2006 | Klemen | |
| 2006/0270516 A1 | | 11/2006 | Klemen | |

\* cited by examiner

*Primary Examiner* — Tisha Lewis

(57) ABSTRACT

A transmission of the present invention has an input member, an output member, four planetary gear sets, a plurality of coupling members and a plurality of torque transmitting devices. Each of the planetary gear sets includes a sun gear, a carrier member supporting a plurality of planet pinion gears and a ring gear member. The torque transmitting devices may include clutches and brakes. The torque transmitting devices are selectively engageable in combinations of at least three to establish a plurality forward speed ratios and at least one reverse speed ratio.

18 Claims, 1 Drawing Sheet

Figures 1, 2:
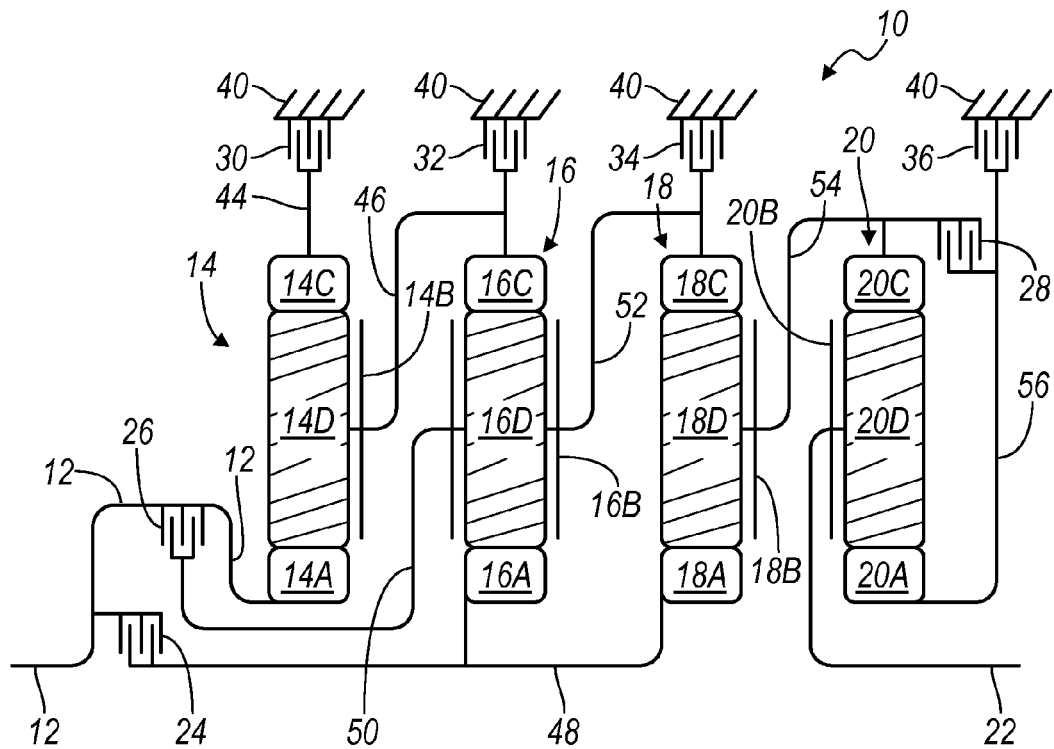

| GEAR STATE | GEAR RATIO | RATIO STEP | TORQUE TRANSMITTING ELEMENTS | | | | | | |
|---|---|---|---|---|---|---|---|---|---|
| | | | 24 | 26 | 30 | 32 | 34 | 36 | 28 |
| REV | -4.480 | | | | X | | X | | X |
| N | | -0.98 | | | O | | O | O | |
| 1ST | 4.572 | | X | | | | X | X | |
| 2ND | 3.094 | 1.48 | X | | | | X | | X |
| 3RD | 2.673 | 1.16 | X | | | X | | X | |
| 4TH | 1.809 | 1.48 | X | | | X | | | X |
| 5TH | 1.406 | 1.26 | X | X | | | | | X |
| 6TH | 1.000 | 1.41 | X | X | | | | | X |
| 7TH | 0.711 | 1.41 | | X | X | | | | X |
| 8TH | 0.614 | 1.16 | | X | | X | | | X |

X = ON - ENGAGED CARRYING TORQUE
O = ON - ENGAGED NOT CARRYING TORQUE

US 8,715,128 B2

MULTI-SPEED TRANSMISSION

FIELD

The invention relates generally to a multiple speed transmission having a plurality of planetary gear sets and a plurality of torque transmitting devices, and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In an embodiment of the present invention, a transmission is provided having an input member, an output member, a first, second, third and fourth planetary gear sets each having sun gears, carrier members and ring gears.

In another embodiment of the present invention, the input member is continuously interconnected with the sun gear of the first planetary gear set.

In yet another embodiment of the present invention, the output member is continuously interconnected with the carrier member of the fourth planetary gear set.

Additionally, in another embodiment of the present invention, a first interconnecting member continuously interconnects the carrier member of the first planetary gear set with the ring gear of the second planetary gear set.

In yet another embodiment of the present invention, a second interconnecting member continuously interconnects the sun gear of the second planetary gear set with the sun gear of the third planetary gear set In yet another embodiment of the present invention, a third interconnecting member continuously interconnects the carrier member of the second planetary gear set with the ring gear of the third planetary gear set.

In yet another embodiment of the present invention, a fourth interconnecting member continuously interconnects the carrier member of the third planetary gear set with the ring gear of the fourth planetary gear set.

Further, in still another embodiment of the present invention, a first torque transmitting device is selectively engageable to interconnect the input member and the sun gear of the first planetary gear set with the sun gear of the second planetary gear set and the sun gear of the third planetary gear set.

In still another embodiment of the present invention, a second torque transmitting device is selectively engageable to interconnect the input member and the sun gear of the first planetary gear set with the carrier member of the second planetary gear set and the ring gear of the third planetary gear set.

In still another embodiment of the present invention, a third torque transmitting device is selectively engageable to interconnect the carrier member of the third planetary gear set with the ring gear of the fourth planetary gear set.

In still another embodiment of the present invention, a fourth torque transmitting device is selectively engageable to interconnect the ring gear of the first planetary gear set with the stationary member.

In still another embodiment of the present invention, a fifth torque transmitting device is selectively engageable to interconnect the carrier member of the first planetary gear set and the ring gear of the second planetary gear set with the stationary member.

In still another embodiment of the present invention, a sixth torque transmitting device is selectively engageable to interconnect the carrier member of the second planetary gear set and the ring gear of the third planetary gear set with the stationary member.

In still another embodiment of the present invention, a seventh torque transmitting device is selectively engageable to interconnect the sun gear of the fourth planetary gear set with the stationary member.

In still another embodiment of the present invention, the torque transmitting devices are each selectively engageable in combinations of at least three to establish at least eight forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 1 is a schematic layout of an embodiment of an eight speed transmission according to the present invention; and FIG. 2 is a truth table presenting the state of engagement of the various torque transmitting elements in each of the available forward and reverse speeds or gear ratios of the transmission illustrated in FIG. 1.

DETAILED DESCRIPTION

The following description is merely exemplary in nature and is not intended to limit the present disclosure, application, or uses.

Referring now to FIG. 1, a stick diagram presents a schematic layout of the embodiment of the eight speed transmission 10 according to the present invention. The transmission 10 includes an input shaft or member 12, a first planetary gear set 14, a second planetary gear set 16, a third planetary gear set 18, a fourth planetary gear set 20 and an output shaft or member 22.

The planetary gear set 14 further includes a sun gear member 14A, a ring gear member 14C and a planet gear carrier member 14B that rotatably supports a set of planet gears 14D

(only one of which is shown). The set of planet gears 14D are each configured to intermesh with both the sun gear member 14A and the ring gear member 14C. The sun gear member 14A is connected for common rotation with an input shaft or member 12. The ring gear member 14C is connected for common rotation with a first shaft or interconnecting member 44. The planet carrier member 14B is connected for common rotation with a second shaft or interconnecting member 46.

The planetary gear set 16 further includes a sun gear member 16A, a ring gear member 16C and a planet gear carrier member 16B that rotatably supports a set of planet gears 16D (only one of which is shown). The planet gears 16D are each configured to intermesh with both the sun gear member 16A and the ring gear member 16C. The sun gear member 16A is connected for common rotation with the third shaft or interconnecting member 48. The ring gear member 16C is connected for common rotation with the second shaft or interconnecting member 46. The planet carrier member 16B is connected for common rotation with a fourth shaft or interconnecting member 50 and with a fifth shaft or interconnecting member 52.

The planetary gear set 18 includes a sun gear member 18A, a ring gear member 18C and a planet gear carrier member 18B that rotatably supports a set of planet gears 18D (only one of which is shown). The set of planet gears 18D are each configured to intermesh with both the sun gear member 18A and the ring gear member 18C. The sun gear member 18A is connected for common rotation with the third shaft or interconnecting member 48. The ring gear member 18C is connected for common rotation with the fifth shaft or interconnecting member 52. The planet carrier member 18B is connected for common rotation with a sixth shaft or interconnecting member 54.

The planetary gear set 20 includes a sun gear member 20A, a ring gear member 20C and a planet gear carrier member 20B that rotatably supports a set of planet gears 20D (only one of which is shown). The set of planet gears 20D are each configured to intermesh with both the sun gear member 20A and the ring gear member 20C. The sun gear member 20A is connected for common rotation with a seventh shaft or interconnecting member 56. The ring gear member 20C is connected for common rotation with the sixth shaft or interconnecting member 54. The planet carrier member 20B is connected for common rotation with the output shaft or member 22.

The input shaft or member 12 is continuously connected to an engine (not shown) or to a turbine of a torque converter (not shown). The output shaft or member 22 is continuously connected with the final drive unit or transfer case (not shown).

With continued reference to FIG. 1, transmission 10 further includes torque-transmitting mechanisms or clutches 24, 26, 28 and the brakes 30, 32, 34 and 36. Clutches 24, 26 and 28 are configured to selectively interconnect the shafts or interconnecting members and the members of the planetary gear set, as will be described in detail below. The brakes 30, 32, 34 and 36 are configured to selectively interconnect the shafts or interconnecting members and members of the planetary gear sets to a transmission housing 40, as will be described in detail below. For example, the first clutch 24 is selectively engageable to connect the input shaft or member 12 with the third shaft or interconnecting member 48. The second clutch 26 is selectively engageable to connect the input shaft 12 with the fourth shaft or interconnecting member 50. The third clutch 28 is selectively engageable to connect the sixth shaft or interconnecting member 54 with the seventh shaft or interconnecting member 56. The first brake 30 is selectively engageable to connect the first shaft or interconnecting member 44 with a stationary element or the transmission housing 40 in order to prevent the first shaft or interconnecting member 44 from rotating relative to the transmission housing 40. The second brake 32 is selectively engageable to connect the second shaft or interconnecting member 46 with a stationary element or the transmission housing 40 in order to prevent the second shaft or interconnecting member 46 from rotating relative to the transmission housing 40. The third brake 34 is selectively engageable to connect the fifth shaft or interconnecting member 52 with the stationary element or the transmission housing 40 in order to prevent the fifth shaft or interconnecting member 52 from rotating relative to the transmission housing 40. The fourth brake 36 is selectively engageable to connect the seventh shaft or interconnecting member 56 with the stationary element or the transmission housing 40 in order to prevent the seventh shaft or interconnecting member 56 from rotating relative to the transmission housing 40.

Referring now to FIGS. 1 and 2, the operation of the embodiment of the eight speed transmission 10 will be described. It will be appreciated that the transmission 10 is capable of transmitting torque from the input shaft or member 12 to the output shaft or member 22 in at least eight forward speed or torque ratios and at least one reverse speed or torque ratio with a double overdrive. Each forward and reverse speed or torque ratio is attained by engagement of one or more of the torque-transmitting mechanisms (i.e. first clutch 24, second clutch 26, third clutch 28, first brake 30, second brake 32, third brake 34 and fourth brake 36), as will be explained below. FIG. 2 is a clutch table presenting the various combinations of torque-transmitting elements that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example, to establish reverse gear, the third clutch 28, the first brake 30 and third brake 34 are engaged or activated. More specifically, the third clutch 28 is engaged to connect the sixth shaft or interconnecting member 54 with the seventh shaft or interconnecting member 56. The first brake 30 connects the first shaft or interconnecting member 44 with the stationary element or the transmission housing 40 in order to prevent the first shaft or interconnecting member 44 from rotating relative to the transmission housing 40. The third brake 34 connects the fifth shaft or interconnecting member 52 with the stationary element or the transmission housing 40 in order to prevent the fifth shaft or interconnecting member 52 from rotating relative to the transmission housing 40. Thus, a reverse gear ratio is established between the input member 12 and the output member 22.

A first gear is established by engaging or activating the first clutch 24, the third brake 34 and fourth brake 36. More specifically, the first clutch 24 is engaged to connect the input shaft or member 12 with the third shaft or interconnecting member 48. The third brake 34 connects the fifth shaft or interconnecting member 52 with the stationary element or the transmission housing 40 in order to prevent the fifth shaft or interconnecting member 52 from rotating relative to the transmission housing 40. The fourth brake 36 connects the seventh shaft or interconnecting member 56 with the stationary element or the transmission housing 40 in order to prevent the seventh shaft or interconnecting member 56 from rotating relative to the transmission housing 40. Thus, a first gear ratio is established between the input member 12 and the output member 22.

A second gear is established by engaging or activating, the first clutch 24, the third clutch 28 and third brake 34. More specifically, the first clutch 24 is engaged to connect the input shaft or member 12 with the third shaft or interconnecting member 48. The third clutch 28 connects the sixth shaft or interconnecting member 54 with the seventh shaft or interconnecting member 56. The third brake 34 connects the fifth shaft or interconnecting member 52 with the stationary element or the transmission housing 40 in order to prevent the fifth shaft or interconnecting member 52 from rotating relative to the transmission housing 40. Thus, a second gear ratio is established between the input member 12 and the output member 22.

A third gear is established by engaging or activating the first clutch 24, the second brake 32 and fourth brake 36. More specifically, the first clutch 24 is engaged to connect the input shaft or member 12 with the third shaft or interconnecting member 48. The second brake 32 connects the second shaft or interconnecting member 46 with a stationary element or the transmission housing 40 in order to prevent the second shaft or interconnecting member 46 from rotating relative to the transmission housing 40. The fourth brake 36 connects the seventh shaft or interconnecting member 56 with the stationary element or the transmission housing 40 in order to prevent the seventh shaft or interconnecting member 56 from rotating relative to the transmission housing 40. Thus, a third gear ratio is established between the input member 12 and the output member 22.

A fourth gear is established by engaging or activating the first clutch 24, the third clutch 28 and second brake 32. More specifically, the first clutch 24 is engaged to connect the input shaft or member 12 with the third shaft or interconnecting member 48. The third clutch 28 connects the sixth shaft or interconnecting member 54 with the seventh shaft or interconnecting member 56. The second brake 32 connects the second shaft or interconnecting member 46 with a stationary element or the transmission housing 40 in order to prevent the second shaft or interconnecting member 46 from rotating relative to the transmission housing 40. Thus, a fourth gear ratio is established between the input member 12 and the output member 22.

A fifth gear is established by engaging or activating the first clutch 24, the third clutch 28 and first brake 30. More specifically, the first clutch 24 is engaged to connect the input shaft or member 12 with the third shaft or interconnecting member 48. The third clutch 28 connects the sixth shaft or interconnecting member 54 with the seventh shaft or interconnecting member 56. The first brake 30 connects the first shaft or interconnecting member 44 with the stationary element or the transmission housing 40 in order to prevent the first shaft or interconnecting member 44 from rotating relative to the transmission housing 40. Thus, a fifth gear ratio is established between the input member 12 and the output member 22.

A sixth gear is established by engaging or activating the first clutch 24, the second clutch 26 and the third clutch 28. More specifically, the first clutch 24 is engaged to connect the input shaft or member 12 with the third shaft or interconnecting member 48. The second clutch 26 connects the input shaft 12 with the fourth shaft or interconnecting member 50. The third clutch 28 connects the sixth shaft or interconnecting member 54 with the seventh shaft or interconnecting member 56. Thus, a sixth gear ratio is established between the input member 12 and the output member 22.

A seventh gear is established by engaging or activating the second clutch 26, the third clutch 28 and first brake 30. More specifically, the second clutch 26 connects the input shaft 12 with the fourth shaft or interconnecting member 50. The third clutch 28 connects the sixth shaft or interconnecting member 54 with the seventh shaft or interconnecting member 56. The first brake 30 connects the first shaft or interconnecting member 44 with the stationary element or the transmission housing 40 in order to prevent the first shaft or interconnecting member 44 from rotating relative to the transmission housing 40. Thus, a seventh gear ratio is established between the input member 12 and the output member 22.

An eighth gear is established by engaging or activating the second clutch 26, the third clutch 28 and second brake 32. More specifically, the second clutch 26 connects the input shaft 12 with the fourth shaft or interconnecting member 50. The third clutch 28 connects the sixth shaft or interconnecting member 54 with the seventh shaft or interconnecting member 56. The second brake 32 connects the second shaft or interconnecting member 46 with a stationary element or the transmission housing 40 in order to prevent the second shaft or interconnecting member 46 from rotating relative to the transmission housing 40. Thus, an eighth gear ratio is established between the input member 12 and the output member 22.

It will be appreciated that the foregoing explanation of operation and gear states of the eight speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. For example, the present invention contemplates that multiple components, i.e. members of the planetary gear sets, maybe formed integrally with an interconnecting member or shaft to form a single member which may be rotatable or fixed. Moreover, two or more shafts or interconnecting members may be joined to form a single member or shaft. Additionally, the present invention contemplates several alternatives to increase the number of ranges and ratio spreads of the transmission 10. More specifically, the clutched, input and output planetary components may be changed to add overdrive ranges instead of under drive ranges. The planetary gear set 20 and clutch 28 may be housed in a separate housing from a housing that houses planetary gear sets 14, 16 and 18. Alternatively, planetary gear set 20 and clutch 28 may be housed in an AWD/4WD transfer case to conserve space. Such variations are not to be regarded as a departure from the spirit and scope of the invention.

What is claimed is:

1. A transmission comprising:
    an input member;
    an output member;
    first, second, third and fourth planetary gear sets each having first, second and third members;
    a first interconnecting member continuously interconnecting the second member of the first planetary gear set with the third member of the second planetary gear set;
    a second interconnecting member continuously interconnecting the first member of the second planetary gear set with the first member of the third planetary gear set;
    a third interconnecting member continuously interconnecting the second member of the second planetary gear set with the third member of the third planetary gear set;

a fourth interconnecting member continuously interconnecting the second member of the third planetary gear set with the third member of the fourth planetary gear set; and seven torque transmitting devices each selectively engageable to interconnect at least one of the first, second, and third members with at least one other of the first members, second members, third members and a stationary member, and wherein the torque transmitting devices are selectively engageable in combinations of at least three to establish a plurality of forward speed ratios and at least one reverse speed ratio between the input member and the output member wherein one of the three members of the planetary gears is a sun gear and the input member is connected to a sun gear of one of the planetary gears and wherein the input member is continuously interconnected with the first member of the first planetary gear set and output member is continuously interconnected with the second member of the fourth planetary gear set.

2. The transmission of claim 1 wherein a first of the seven torque transmitting devices is selectively engageable to interconnect the input member and the first member of the first planetary gear set with the first member of the second planetary gear set and the first member of the third planetary gear set.

3. The transmission of claim 2 wherein a second of the seven torque transmitting devices is selectively engageable to interconnect the input member and the first member of the first planetary gear set with the second member of the second planetary gear set and the third member of the third planetary gear set.

4. The transmission of claim 3 wherein a third of the seven torque transmitting devices is selectively engageable to interconnect the second member of the third planetary gear set and the third member of the fourth planetary gear set with the first member of the fourth planetary gear set.

5. The transmission of claim 4 wherein a fourth of the seven torque transmitting devices is selectively engageable to interconnect the third member of the first planetary gear set with the stationary member.

6. The transmission of claim 5 wherein a fifth of the seven torque transmitting devices is selectively engageable to interconnect the second member of the first planetary gear set and the third member of the second planetary gear set with the stationary member.

7. The transmission of claim 6 wherein a sixth of the seven torque transmitting devices is selectively engageable to interconnect the second member of the second planetary gear set and the third member of the third planetary gear set with the stationary member.

8. The transmission of claim 7 wherein a seventh of the seven torque transmitting devices is selectively engageable to interconnect the first member of the fourth planetary gear set with the stationary member.

9. The transmission of claim 1 wherein the first member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members and the third member of the first planetary gear set, the third member of the second planetary gear set, the third member of the third planetary gear set and the third member of the fourth planetary gear set are ring gears.

10. The transmission of claim 1 wherein four of the seven torque transmitting devices are brakes and three of the seven torque transmitting devices are clutches.

11. The transmission of claim 1 wherein the stationary member is a transmission housing.

12. A transmission comprising:
an input member;
an output member;
first, second, third and fourth planetary gear sets each having first, second and third members, wherein the input member is continuously interconnected with the first member of the first planetary gear set and output member is continuously interconnected with the second member of the fourth planetary gear set;
a first interconnecting member continuously interconnecting the second member of the first planetary gear set with the third member of the second planetary gear set;
a second interconnecting member continuously interconnecting the first member of the second planetary gear set with the first member of the third planetary gear set;
a third interconnecting member continuously interconnecting the second member of the second planetary gear set with the third member of the third planetary gear set;
a fourth interconnecting member continuously interconnecting the second member of the third planetary gear set with the third member of the fourth planetary gear set;
a first torque transmitting device selectively engageable to interconnect the input member and the first member of the first planetary gear set with the first member of the second planetary gear set and the first member of the third planetary gear set;
a second torque transmitting device selectively engageable to interconnect the input member and the first member of the first planetary gear set with the second member of the second planetary gear set and the third member of the third planetary gear set;
a third torque transmitting device selectively engageable to interconnect the second member of the third planetary gear set with the third member of the fourth planetary gear set;
a fourth torque transmitting device selectively engageable to interconnect the third member of the first planetary gear set with a stationary member;
a fifth torque transmitting device selectively engageable to interconnect the second member of the first planetary gear set and the third member of the second planetary gear set with the stationary member; and
a sixth torque transmitting device selectively engageable to interconnect the second member of the second planetary gear set and the third member of the third planetary gear set with the stationary member; and
a seventh torque transmitting devices selectively engageable to interconnect the first member of the fourth planetary gear set with the stationary member, and
wherein the torque transmitting devices are each selectively engageable in combinations of at least three to establish at least eight forward speed ratios and at least one reverse speed ratio between the input member and the output member.

13. The transmission of claim 12 wherein the first member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members and the third member of the first planetary gear set, the third member of the second planetary gear set, the third member of the third planetary gear set and the third member of the fourth planetary gear set are ring gears.

14. The transmission of claim 12 wherein the stationary member is a transmission housing.

15. A transmission comprising:
an input member;
an output member;
first, second, third and fourth planetary gear sets each having a sun gear, a carrier member and a ring gear, wherein the input member is continuously interconnected with the sun gear of the first planetary gear set and output member is continuously interconnected with the carrier member of the fourth planetary gear set;
a first interconnecting member continuously interconnecting the carrier member of the first planetary gear set with the ring gear of the second planetary gear set;
a second interconnecting member continuously interconnecting the sun gear of the second planetary gear set with the sun gear of the third planetary gear set;
a third interconnecting member continuously interconnecting the carrier member of the second planetary gear set with the ring gear of the third planetary gear set;
a fourth interconnecting member continuously interconnecting the carrier member of the third planetary gear set with the ring gear of the fourth planetary gear set;
a first torque transmitting device selectively engageable to interconnect the input member and the sun gear of the first planetary gear set with the sun gear of the second planetary gear set and the sun gear of the third planetary gear set;
a second torque transmitting device selectively engageable to interconnect the input member and the sun gear of the first planetary gear set with the carrier member of the second planetary gear set and the ring gear of the third planetary gear set;
a third torque transmitting device selectively engageable to interconnect the carrier member of the third planetary gear set with the ring gear of the fourth planetary gear set;
a fourth torque transmitting device selectively engageable to interconnect the ring gear of the first planetary gear set with a stationary member;
a fifth torque transmitting device selectively engageable to interconnect the carrier member of the first planetary gear set and the ring gear of the second planetary gear set with the stationary member; and
a sixth torque transmitting device selectively engageable to interconnect the carrier member of the second planetary gear set and the ring gear of the third planetary gear set with the stationary member; and
a seventh torque transmitting devices selectively engageable to interconnect the sun gear of the fourth planetary gear set with the stationary member, and
wherein the torque transmitting devices are each selectively engageable in combinations of at least three to establish at least eight forward speed ratios and at least one reverse speed ratio between the input member and the output member.

16. The transmission of claim 15 wherein the first, second, third, fourth fifth, sixth and seventh interconnecting members are rotatable shafts.

17. The transmission of claim 15 wherein the first, second and third torque transmitting devices are rotating clutches.

18. The transmission of claim 17 wherein the fourth, fifth, sixth and seventh torque transmitting devices are brakes.

* * * * *